3,278,292
HERBICIDAL COMPOSITIONS AND METHODS EMPLOYING 3-PHENYL-3-ALKOXYUREAS

Rayner S. Johnson, Wilmington, Del., assignor to E. I. du Pont de Nemours and Company, Wilmington, Del., a corporation of Delaware
No Drawing. Filed Jan. 2, 1963, Ser. No. 248,884
2 Claims. (Cl. 71—2.6)

This application is a continuation-in-part of my then copending application, Serial No. 59,831 filed October 3, 1960 (now abandoned), which is a continuation-in-part of my then copending application, Serial No. 850,547, filed November 3, 1959 (now abandoned).

This invention relates to certain aryl alkyl ureas and to herbicidal compositions and methods.

The compounds of this invention possess outstanding utility in application to noxious weeds growing in economic cropland such as cotton, field and sweet corn, sugar cane, sorghum, potatoes and the like, with effective weed control being obtained without corresponding injury to the crop. These compounds are extremely effective as foliar herbicides and pre-emergence herbicides.

The compounds of this invention are those represented by the formula:

(1)
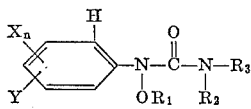

where:
X is hydrogen, methyl or halogen, preferably the latter;
Y is hydrogen, halogen, nitro, alkyl of less than 5 carbon atoms or alkoxy of less than 5 carbon atoms;
$n$ is a positive whole number less than 3, that is 1 or 2;
$R_1$ is an alkyl radical of less than 5 carbon atoms;
$R_2$ is hydrogen, alkyl of less than 5 carbon atoms or alkoxy of less than 5 carbon atoms; and
$R_3$ is alkyl of less than 5 carbon atoms;
provided that the sum of carbon atoms in $R_2$ and $R_3$ is less than 6.

The compounds of this invention can be prepared by reducing nitrobenzene or substituted nitrobenzene with a suitable reducing agent such as, for example, zinc dust to get the corresponding phenylhydroxylamine. This amine is then reacted with a substituted carbamyl chloride in a suitable reaction medium such as benzene, xylene, dioxane, methylene chloride, pyridine, or the like, to obtain the corresponding 3-phenyl-3-hydroxyurea. This hydroxyurea can in turn be reacted with dimethylsulfate to yield the corresponding 3-phenyl-3-methoxyurea.

In an alternative procedure, in place of a substituted carbamyl chloride an isocyanate such as methylisocyanate is used to obtain the corresponding 3-phenyl-3-hydroxy-1-alkylurea which in turn is reacted with dimethyl sulfate to yield the desired 3-phenyl or substituted phenyl-3-methoxy-1-alkylurea. Suitable alkylating agents can, of course, be substituted for the dimethyl sulfate to obtain other corresponding compounds.

Thus by these routes compounds such as the following preferred ones can be prepared:

3-phenyl-3-methoxy-1-methylurea
3-phenyl-3-methoxy,1,1-dimethylurea
3-(p-chlorophenyl)-3-methoxy-2-methylurea
3-(p-chlorophenyl)-3-methoxy-1,1-dimethylurea
3-(3,4-dichlorophenyl)-3-methoxy-1-methylurea
3-(3,4-dichlorophenyl)-3-methoxy-1,1-dimethylurea
3-phenyl-3-methoxy-1-ethyl-1-methylurea
3-(p-chlorophenyl)-3-methoxy-1-butyl-1-methylurea
3-(3,4-dichlorophenyl)-3-methoxy-1-butyl-1-methylurea
3-(2,4,5-trichlorophenyl)-3-methoxy-1-methylurea Among other compounds that can be prepared according to the above-described procedures can be mentioned:

3-(3-chloro-4-methylphenyl)-3-butoxy-1-methylurea
3-(p-bromophenyl)-3-ethoxy-1,1-dimethylurea
3-(3-nitro-4-chlorophenyl)-3-methoxy-1-methyl-1-butylurea
3-(3-chloro-4-methoxyphenyl)-3-methoxy-1,1-dimethylurea
3-(3-chloro-3-isopropylphenyl)-3-ethoxy-1-ethyl-1-methylurea
3-(3,4-dimethylphenyl)-3-methoxy-1-methylurea
3-(3-nitro-4-methylphenyl)-3-methoxy-1,1-dimethylurea
3-3,4-dichlorophenyl)-1,3-dimethoxy-1-methylurea
3-(p-fluorophenyl)-3-ethoxy-1-methoxy-1-methylurea The substituted ureas of the above-described type possess outstanding herbicidal activity. They are most effective as foliar herbicides and pre-emergence herbicides, being characterized by specific activity of an interesting, useful and unique type. They have the significant advantage of high oil solubility and soil presistence not possessed by certain closely related prior art compounds.

Of particular significance and advantage is the unobvious ability of the compounds of this invention to provide longer lasting weed control when compared with prior art herbicides. The compounds of this invention are particularly useful in weed control among such crops as asparagus, sugar cane, grapes, and berries where effective weed control is obtained without corresponding injury to the crop.

Of the above-described compounds by far the best from the standpoint of usage are the following:

3-phenyl-3-methoxy-1,1-dimethylurea
3-(p-chlorophenyl)-3-methoxy-1,1-dimethylurea
3-(3,4-dichlorophenyl)-3-methoxy-1,1-dimethylurea
3-(3,4-dichlorophenyl)-3-methoxy-1-methylurea These compounds are characterized not only by outstanding herbicidal activity, but furthermore are soluble in many common solvents such as benzene thereby making it possible to formulate these compounds as liquid concentrates. In contrast, the conventional substituted urea herbicides are highly insoluble in conventional solvents.

Herbicidal compositions of the invention are prepared by admixing the substituted urea, in a herbicidally effective amount, with a conditioning agent of the kind used and referred to in the art as a pest control adjuvant or modifier to provide formulations adapted for ready and efficient application to soil or weeds (i.e. unwanted plants) using conventional applicator equipment.

Thus the herbicidal compositions or formulations are prepared in the form of solids or liquids. Solid compositions are preferably in the form of dusts and are compounded to give homogeneous free-flowing dusts by admixing the active compound with finely-divided solids, preferably talcs, natural clays, pyrophyllite, diatomaceous earth or flours such as walnut shell, wheat, redwood, soya bean, cottonseed flours and other inert solid conditioning agents or carriers of the kind conventionally employed in preparing pest control compositions in dust or powder form.

Liquid compositions of the invention are prepared in the usual way by admixing the substituted urea with a suitable liquid diluent media. With certain solvents such as alkylated naphthalene, dimethylformamide and cresol, relative high, up to about 35% by weight or more, concentrations of the active urea compound can be obtained in solution. Other liquids conventionally used in preparing liquid herbicidal compositions can also be used.

The herbicidal compositions of the invention whether in the form of dusts or liquids preferably also include a surface-active agent of the kind sometimes referred to in the art as a wetting, dispersing or emulsifying agent. These agents which will be referred to hereinafter more simply as surface-active agents cause the compositions to be easily wetted and dispersed in water to give aqueous sprays which for the most part constitute a desirable composition for application.

The surface-active agent or surfactant can include such anionic, cationic and non-ionic agents as have heretofore been generally employed in herbicidal compositions of similar type. Suitable surface-active agents are set out, for example, in Searle U.S. Patent 2,426,417; Todd U.S. Patent 2,655,447; Jones U.S. Patent 2,412,510; or Lenher U.S. Patent 2,139,276. A detailed list of such agents is set forth in "Detergents and Emulsifiers—Up to Date" (1962) by John W. McCutcheon, Inc., and Bulletin E–607 of the Bureau of Entomology and Plant Quarantine of the U.S. Department of Agriculture.

Suitable surface-active agents for use in compositions of the present invention are: polyethylene glycol fatty esters and fatty alkylol amide condensates, alkyl aryl sulfonates, fatty alcohol sulfates, dialkyl esters of sodium sulfosuccinate, fatty acid esters of sodium isethionate, polyoxyethylene thioethers and long chain quaternary ammonium chloride.

Surface-active agents such as sodium lignin sulfonates, low viscosity methyl cellulose, polymerized sodium salts of alkyl naphthalene sulfonic acids are also suitable in the herbicidal compositions of this invention.

Among the more preferred surfactants are the anionic and non-ionic type. Among the anionic surface-active agents, preferred ones are alkali metal or amine salts of alkyl benzene sulfonic acids such as dodecylbenzene sulfonic acid, sodium lauryl sulfate, alkyl naphthalene sulfonates, sodium N-methyl-N-oleoyltaurate, oleic acid ester of sodium isethionate, dioctyl sodium sulfosuccinate, sodium dodecyldiphenoloxide disulfonate. Among the non-ionic compounds, preferred members are alkyl phenoxy poly(ethyleneoxy)ethanols such as nonyl phenol adducts with ethylene oxide; trimethyl nonylpolyethylene glycol ethers, polyethylene oxide adducts of fatty and rosin acids, long chain alkyl mercaptan adducts with ethylene oxide.

In general, less than 10% by weight of the surface-active agent will be used in compositions of this invention and ordinarily the amount of surface-active agents will range from 1–5% but may even be less than 1% by weight.

Additional surface-active agents can be added to the above formulation to increase the ratio of surface-active agent:active agent up to as high as 5:1 by weight. Normally the purpose of adding higher amounts of surfactant is to increase the herbicidal effect of the active compounds. When used at higher rates it is preferred that the surfactant be present in the range of one fifth to five parts surfactant for each one part of active agent.

The herbicidal compositions are applied either as a spray, granule, pellet, or a dust to the locus or area to be protected from undesirable plant growth, commonly called weeds, i.e. plants growing where they are not wanted. Such application can be made directly upon the locus or area and the weeds thereon during the period of weed infestation in order to destroy the weeds but, if desired, the application can be made in advance of an anticipated weed infestation to prevent such infestation. Thus the compositions can be applied as aqueous foliar sprays and can also be applied as sprays directly to the surface of the soil. Alternatively, the dried powder compositions can be dusted directly on the plants or on the soil. Application of granules is an effective method for obtaining pre-emergence control of weeds with minimum injury to foliage of desired growing plants. Application of pellets, either by hand or by machine applicators, e.g. by airplane, is an effective method for obtaining complete kill of undesired brush growth in fence rows, under power lines, etc.

The active compound is, of course, applied in amount sufficient to exert the desired herbicidal action. The amount of the active substituted urea present in the compositions as actually applied for destroying, preventing or controlling weeds will vary with the manner of application, the particular weeds for which control is sought, the purposes for which the application is being made, and like variables. In general, the herbicidal compositions as applied in the form of a spray, granule, pellet, or a dust will contain from about 0.5% to 85% by weight of substituted urea.

Ordinarily, the herbicidal compounds of this invention will be applied to the area to be treated at a rate from 0.25 to 100 pounds per acre. When formulated with other materials, such materials can include fertilizers and other pest control agents such as insecticides, fungicides, and other herbicides. Highly effective herbicidal compositions can be prepared comprising at least one compound of this invention in admixture with another herbicidally active ingredient. In addition, the composition can contain one or more of the herbicidal composition adjuvants or conditioners referred to above, or those described fully in Luckenbaugh U.S. Patent 2,935,393 issued May 3, 1960, the disclosure of the patent relating to compositions and methods of application being herewith incorporated by reference in its entirety.

Particularly useful compositions will contain, for each ten parts by weight of a compound of the present invention, another herbicidally active ingredient listed as follows in the indicated amount expressed as parts by weight.

| Herbicide: | Parts |
|---|---|
| 3 - (3,4 - dichlorophenyl) - 1,1 - dimethylurea | 2–30 |
| 3 - (4 - chlorophenyl) - 1,1 - dimethylurea | 2–30 |
| 3-phenyl-1,1-dimethylurea | 2–30 |
| 3 - (3,4 - dichlorophenyl)-1-n-butyl-1 - methylurea | 2–30 |
| 3 - (3,4 - dichlorophenyl)-1-methoxy-1-methylurea | 2–30 |
| 3 - (4 - chlorophenyl) - 1 - methoxy-1-methylurea | 2–30 |
| 3 - (3,4 - dichlorophenyl) - 1,1,3-trimethylurea | 2–30 |
| 3 - (3,4-dichlorophenyl) - 1,1 - diethylurea | 2–30 |
| 3 - (p - chlorophenoxyphenyl) - 1,1-dimethylurea | 2–30 |
| 2 - chloro - 4,6 - bis(ethylamino)-s-triazine | 2–30 |
| 2 - chloro - 4 - ethylamino - 6 - isopropylamino - s - triazine | 2–30 |
| 2 - chloro - 4,6 - bis(methoxypropylamino) - s - triazine | 2–30 |
| 2 - methoxy-4,6-bis(isopropylamino)-s - triazine | 2–30 |
| 2 - diethylamino - 4 - isopropylacetamido - 6 - methoxy-s-triazine | 2–30 |
| 2-isopropylamino - 4 - methoxyethylamino - 6 - methyl - mercapto-s-triazine | 2–30 |
| 2 - methylmercapto - 4,6 - bis(ispropyl) - s - triazine | 2–30 |
| 2 - methylmercapto - 4,6 - bis(ethylamino) - s - triazine | 2–30 |
| 2 - methylmercapto - 4 - ethylamino-6 - isopropylamino - s - triazine | 2–30 |
| 2 - methoxy - 4,6 - bis(ethylamino)-s-triazine | 2–30 |
| 2 - methoxy - 4 - ethylamino - 6 - isopropylamino - s - triazine | 2–30 |
| 2 - chloro - 4,6 - bis(isopropylamino)-s - triazine | 2–30 |
| Dinitro-sec. butylphenol and its salts | 0.1–400 |

| Herbicide: | Parts |
|---|---|
| Pentachlorophenol and its salts | 1.6–1200 |
| 2,3,6 - trichlorobenzoic acid and its salts | 1.5–70 |
| 2,3,5,6-tetrachlorobenzoic acid and its salts | 2–90 |
| 2 - methoxy - 3,5,6 - trichlorobenzoic acid and its salts | 2–90 |
| 2-methoxy - 3,6 - dichlorobenzoic acid and its salts | 2–90 |
| 3-amino - 2,5 - dichlorobenzoic acid and its salts | 2–90 |
| 3 - nitro-2,5-dichlorobenzoic acid and its salts | 2–90 |
| 2-methyl - 3,6 - dichlorobenzoic acid and its salts | 1.5–70 |
| 2,4 - dichlorophenoxyacetic acid and its salts and esters | 0.1–80 |
| 2,4,5 - trichlorophenoxyacetic acid and its salts and ester | 0.1–80 |
| (2-methyl - 4 - chlorophenoxy)acetic acid and its salts and esters | 0.1–80 |
| 2 - (2,4,5-trichlorophenoxy)propionic acid and its salts and esters | 0.1–80 |
| 2 - (2,4,5 - trichlorophenoxy)ethyl-2,2-dichloro-propionate | 0.1–80 |
| 4 - (2,4 - dichlorophenoxy)butyric acid and its salts and esters | 0.2–160 |
| 4 - (2 - methyl - 4 - chlorophenoxy) butyric acid and its salts and esters | 0.2–160 |
| 2,3,6 - trichlorobenzyloxypropanol | 0.2–160 |
| 2,6 - dichlobenzonitrile | 0.2–240 |
| Trichloroacetic acid and its salts | 0.2–240 |
| 2,2 - dichloropropionic acid and its salts | 0.2–240 |
| N,N - di(n - propyl)thiolcarbamic acid, ethyl ester | 0.1–80 |
| N,N - di(n - propyl)thiolcarbamic acid, n-propyl ester | 0.1–80 |
| N-ethyl - N - (n-butyl)thiolcarbamic acid, ethyl ester | 0.1–80 |
| N-ethyl - N - (n-butyl)thiolcarbamic acid, n-propyl ester | 0.1–80 |
| N - phenylcarbamic acid, isopropyl ester | 3–400 |
| N - (m - chlorophenyl)carbamic acid, isopropyl ester | 3–400 |
| N - (m - chlorophenyl)carbamic acid, 4 - chloro - 2 - butynyl ester | 3–400 |
| 2,3,6 - trichlorophenylacetic acid and its salts | 1.5–70 |
| 2-chloro - N,N - diallylacetamide | 3–240 |
| Maleic hydrazide | 3–320 |
| Calcium propylarsonate | 7.5–450 |
| Disodium monomethylarsonate | 7.5–400 |
| Octyl - dodecylammoniummethylarsonate | 7.5–400 |
| Dimethylarsinic acid | 7.5–400 |
| Sodium arsenite | 4–300 |
| Lead arsenate | 3200–130,000 |
| Calcium arsenate | 1600–65,000 |
| Sodium tetraborate hydrated, granulated | 900–32,000 |
| Unrefined borate ore such as borascu | 900–32,000 |
| Sodium metaborate | 900–32,000 |
| Sodium pentaborate | 900–32,000 |
| Polyborchlorate | 900–32,000 |
| Ammonium thiocyanate | 0.1–400 |
| Sodium chlorate | 2.5–2000 |
| Ammonium sulfamate | 4–800 |
| 5,6 - dihydro - (4A,6A) - dipyrido-(1,2-A,2',1'-C) pyrazinium dibromide | 0.1–240 |
| 3-amino - 1,2,4 - triazole | 0.5–200 |
| 3,6-endoxohexahydrophthalic acid | 3–200 |
| Hexachloroacetone | 5–160 |
| Diphenylacetonitrile | 1–300 |
| N,N - dimethyl-α,α-diphenylacetamide | 1–300 |
| N,N - di - n - propyl - 2,6 - dinitro-4-trifluoromethyl - aniline | 1–300 |
| N,N - di - n - propyl - 2,6 - dinitro-4-methylaniline | 1–300 |
| O-(2,4 - dichlorophenyl) - O - methylisopropyl - phosphoramidothiate | 2.5–200 |
| 2,3,5,6 - tetrachloroterephthalic acid, dimethyl ester | 2.5–200 |
| 2,4-dichloro - 4' - nitrodiphenyl ether | 1–300 |

In order that the invention can be better understood, the following examples are given in addition to the examples already given above. The examples illustrate the preparation of the substituted ureas, herbicidal formulations employing such compounds, herbicidal applications, and the results obtained. All percents are by weight unless otherwise indicated.

EXAMPLE 1

3-(3,4-dichlorophenyl)-3-methoxy-1,1-dimethylurea

A mixture of 24.9 parts by weight of 3-(3,4-dichlorophenyl) - 3 - hydroxy - 1,1 - dimethylurea in 200 parts by weight of 50% aqueous dioxane is stirred vigorously while being treated gradually with 18.9 parts by weight of dimethyl sulfate. A solution of 2 N sodium hydroxide is added simultaneously with the dimethyl sulfate at such a rate as to maintain a pH of 7 to 10. During this addition the temperature is held at 35 to 55° C. The sodium hydroxide addition is continued until the rate of pH change is negligible. The desired 3-(3,4-dichlorophenyl)-3-methoxy-1,1-dimethylurea is isolated by extraction of the mixture with methylene chloride followed by removal of the solvent from the extract.

EXAMPLE 2

3-(p-chlorophenyl)-3-methoxy-1,1-dimethylurea

A mixture of 19.6 parts by weight of 3-(p-chlorophenyl)-3-hydroxy-1-methylurea in 200 parts by weight of 50% aqueous dioxane is treated with 37.8 parts by weight of dimethyl sulfate and a solution of 2 N sodium hydroxide in the same manner as Example 1. The same isolation procedure is used to obtain 3-(p-chlorophenyl)-3-methoxy-1,1-dimethylurea.

Any of the compounds in the lists appearing hereinbefore can be prepared by at least one of the above-described procedures. One merely has to choose a proportionate amount of the appropriate starting reagents.

EXAMPLE 3

To demonstrate the herbicidal activity of the compounds of Examples 1 and 2, they are applied at the rate of 4 lbs./acre of active ingredient in the form of a spray containing 1% by weight of these compounds to the foliage of mustard plants and Johnson grass seedlings. It is found that these treatments give good control of both the mustard plants (dicotyledonous plants) and the Johnson grass seedlings (monocotyledonous plants), thereby indicating high foliar activity against both these types of plants. The pre-emergence activity of these compounds is demonstrated by applying them at the rate of 1, 2 and 3 pounds per acre to plots containing seeds of a variety of broadleaf and grassy weeds. It is found that these treatments also give good control of the weeds. Thus, it is found that these compounds have outstandingly high herbicidal activity not only in foliar applications but also in pre-emergence treatment.

EXAMPLE 4

The active compounds of Examples 1 and 2 are formulated into water-dispersible powder herbicidal compositions in accordance with the present invention to provide a composition suitable for dispersion in water to give a herbicidal spray. The water-dispersible powder compositions are made by intimately mixing the ingredients listed below using conventional mixing equipment and then grinding the mixture to give a powder having an average particle size less than about 50 microns.

| | Percent |
|---|---|
| Active compound | 75.00 |
| Fuller's earth | 23.75 |
| Sodium lauryl sulfate, 50% (wetting agent) | 1.00 |
| Methylcellulose, 15 cps. (dispersing agent) | 0.25 |

This formulation is used as a pre-emergence treatment in a newly planted field of cotton. When applied at the rate of 1.5 lbs./acre of active ingredient in 40 gallons of water, excellent control of germinating annual grasses and broadleaves is obtained.

The compounds of Examples 1 and 2 are formulated into dust compositions in accordance with the present invention that are adapted for direct application as a dust. These dust compositions are made by blending or mixing the ingredients shown below and grinding the mix to give a composition having an average particle size less than about 50 microns.

| | Percent |
|---|---|
| Active compound | 20 |
| Talc | 80 |

The compounds of Examples 1 and 2 are formulated into a powdered herbicidal concentrate adapted for use in the preparation of a spray using either an oil, water or a combination of oil and water as a liquid diluent. The powder concentrates are made by conventional mixing and grinding operations using the materials shown below in the rate proportions indicated.

| | Percent |
|---|---|
| Active compound | 70 |
| Fuller's earth | 26 |
| Trimethylnonyl ether of polyethylene glycol (Tergitol TMN) | 4 |

The compounds of Examples 1 and 2 are formulated into emulsifiable oil compositions of the types shown below by thoroughly mixing and dispersing the active ingredient and conditioning agents in the organic diluent.

| | Percent |
|---|---|
| Active compound | 25 |
| Xylene | 70 |
| Mixture of oil soluble sulfonates and polyoxyethylene sorbitol esters of rosin and fatty acids | 5 |

EXAMPLE 5

The compounds of this application are formulated into water-dispersible powders by intimately mixing the ingredients listed below with conventional mixing equipment and then grinding the mixture to give powders having an average particle size less than about 50 microns. A typical composition is:

| | Percent |
|---|---|
| 3 - (p - chlorophenyl) - 3 - methoxy-1,1-dimethylurea | 75.00 |
| Fuller's earth | 23.75 |
| Sodium lauryl sulfate, 50% (wetting agent) | 1.00 |
| Methyl cellulose, 15 cps. (dispersing agent) | 0.25 |

The resulting formulation is then diluted with water (15 lbs./100 gallons) and applied at the rate of 30 lbs./acre of active ingredient with a tractor mounted sprayer. This treatment gives excellent control of a mixed population of broadleaves and grass weeds such as crabgrass, quackgrass, ragweed, lambs-quarters, and goldenrod.

EXAMPLE 6

A formulation of Example 5 containing 15 pounds of 3-(p-chlorophenyl)-3-methoxy-1,1-dimethylurea is admixed with five pounds of trimethylnonyl ether of polyethoxyethylene, containing 6 moles of ethylene oxide, in 100 gallons of water. This formulation is dispersed with a tractor mounted sprayer over one acre containing vigorously growing annual broadleaf and grass weeds. Excellent control of the weeds is obtained.

EXAMPLE 7

These compounds can also be formulated into dust compositions. A typical dust composition is prepared by blending or mixing the ingredients shown below and grinding the mix to give a composition having an average particle size less than about 50 microns.

| | Percent |
|---|---|
| 3 - (3,4 - dichlorophenyl)-3-ethoxy-1-butyl-1-methylurea | 5 |
| Talc | 95 |

This dust composition is used at the rate of 20 lbs./acre of active compound for the control of vegetation growing around power transformers, telephone poles and highway markers. Excellent control of a general infestation of annual broadleaf and grass species such as pigweed, lambs-quarters, foxtail, barnyard grass and crabgrass is obtained.

EXAMPLE 8

| | Percent |
|---|---|
| 3-phenyl-3-methoxy-1,1-dimethylurea | 4 |
| Granular attapulgite | 96 |

The above granular product is prepared by tumbling the attapulgite granules in a drum while spraying on a solution of the urea in acetone, then removing the acetone with heat.

This formulation has excellent utility for the control of deep-rooted perennial weeds, when applied with an adapted tractor spreader at the rate of 30 lbs./acre of active ingredient. Good control of field bindweed, leafy spurge, quackgrass and nutsedge is obtained.

This formulation is applied easily to weeds growing along railroad rights-of-way. Twenty lbs./acre of active compound gives excellent control of crabgrass, wild barley, foxtail, barnyard grass, ragweed and goldenrod.

EXAMPLE 9

| | Percent |
|---|---|
| 3 - (2,4,5-trichlorophenyl)-3-methoxy-1-ethyl-1-methylurea | 25 |
| Anhydrous sodium sulfate | 10 |
| Ethyl naphthalene sulfonic acid, Na salt | 1 |
| Ca, Mg, bentonite | 64 |

The finely divided components are first blended, then moistened with water and extruded to form pellets and dried.

This formulation gives excellent control of brush species. Rates of 30 lbs./acre of the formulation gives excellent control of oak and winged elm in pastures. Sixty lbs./acre of the formulation gives control of maple, ash, willow, privet, and poplar growing in fence rows.

EXAMPLE 10

The herein described compounds may be formulated into emulsifiable oil compositions of the type illustrated blow by dissolving the urea and the conditioning agents in the organic diluent.

| | Percent |
|---|---|
| 3-(3,4-dichlorophenyl) - 3-methoxy - 1,1-dimethylurea | 15 |
| Xylene | 80 |
| Methyl phenyl polyether alcohol | 5 |

This emulsifiable oil is mixed with 100 gallons of water at the site of spraying. When applied at the rate of 25 lbs./acre of active compound on ditch banks, excellent control of quackgrass, crabgrass, foxtail, downy bromegrass, ragweed, pigweed, purslane and wild carrot is obtained.

EXAMPLE 11

3-(p-chlorophenyl)-1,3-dimethoxy-1-methylurea is dissolved in "Lion Herbicidal Oil No. 6" (1 lb./10 gallons of oil) and applied with a railroad spray car at the rate of 15 lbs. of active ingredient along railroad rights-of-way. Excellent control of established mature vegetation such as wild mustard, peppergrass, morning glory, jimsonweed, cockleburr, crabgrass and seedling Johnson grass is obtained.

EXAMPLE 12

| | Percent |
|---|---|
| 3-(3,4-dichlorophenyl) - 3-methoxy - 1,1-dimethylurea | 75.00 |
| Fuller's earth | 27.75 |
| Sodium lauryl sulfate, 50% | 1.00 |
| Methyl cellulose, 15 cps. | 0.25 |

This wettable powder formulation is applied pre-emergence at the rate of one pound of active ingredient per acre in 40 gallons water for the control of wild carrots, wild mustard and crabgrass along a fence row. Excellent control is noted 40 days after treatment.

EXAMPLE 13

The wettable powder of Example 12 is dispersed at a rate of 1.25 pounds in 40 gallons of water containing 0.5% of trimethylnonyl ether of polyethoxyethylene (6 moles ethylene oxide).

This spray is applied as a directed post-emergence treatment to young weeds twelve inches high growing in cotton. Excellent contact activity is obtained on crabgrass, giant foxtail, barnyard grass, ragweed and velvet leaf. This spray treatment has the advantage of very rapid kill of the weeds plus good residual control of annual weeds that germinate later.

EXAMPLE 14

The wettable powder formulation of Example 12 is applied at the rate of three pounds of active ingredient per acre in 40 gallons of water. This dissemination gives excellent pre-emergence control of a mixed population of annular broadleaf and grass weeds in an asparagus planting. Extended residual weed control is obtained throughout the growing season.

An early spring application of four pounds/acre of active ingredient in 40 gallons of water gives excellent control of annual broadleaf and grass weeds in grapes throughout the spring and summer season.

EXAMPLE 15

The wettable powder formulation of Example 12 has outstanding utility for the control of weeds growing in cotton fields, when applied as a directed post-emergence spray at a rate of 0.5 to 3.0 pounds of active ingredient per acre in 40 gallons of water. A wide variety of emerged weeds are controlled without visible injury to the cotton. Weeds that are controlled include crabgrass, foxtail (green, yellow and giant), barnyard grass, Johnson grass, pigweed, lambs-quarters, cockleburr and annual morning glory. Since this compound has good pre-emergence activity, the area treated remains weed free for an extended period of time.

EXAMPLE 16

| | Percent |
|---|---|
| 3-(3,4-dichlorophenyl) - 3-methoxy - 1,1-dimethylurea | 3 |
| 3-(3,4-dichlorophenyl)-1,1-dimethylurea | 3 |
| Talc | 94 |

A dust composition is prepared by blending and mixing the ingredients until the particles are all below 50 microns.

This dust composition is used at the rate of 20 pounds per acre of active compounds for the control of vegetation growing along railroad rights-of-way. Excellent control of a general infestation of broadleaf and grass species is obtained.

EXAMPLES 17–92

The following compounds are substituted one at a time for the 3-(3,4-dichlorophenyl)-1,1-dimethylurea of Example 16 in like amount by weight. They are formulated and applied in like manner to give like results.

Example:
17. 3-(4-chlorophenyl)-1,1-dimethylurea
18. 3-phenyl-1,1-dimethylurea
19. 3-(3,4-dichlorophenyl)-1-n-butyl-1-methylurea
20. 3-(3,4-dichlorophenyl)-1-methoxy-1-methylurea
21. 3-(4-chlorophenyl)-1-methoxy-1-methylurea
22. 3-(3,4-dichlorophenyl)-1,1,3-trimethylurea
23. 3-(3,4-dichlorophenyl)-1,1-diethylurea
24. 3-(p-chlorophenoxyphenyl)-1,1-dimethylurea
25. 2-chloro-4,6-bis(ethylamino)-s-triazine
26. 2-chloro - 4-ethylamino - 6-isopropylamino-s-triazine
27. 2-chloro - 4,6 - bis(methoxypropylamino)-s-triazine
28. 2-methoxy-4,6-bis(isopropylamino)-s-triazine
29. 2-diethylamino - 4-isopropylacetamido - 6-methoxy-s-triazine
30. 2 - isopropylamino - 4-methoxyethylamino - 6-methylmercapto-s-triazine
31. 2-methylmercapto - 4,6 - bis(isopropylamino)-s-triazine
32. 2-methylmercapto-4,6-bis(ethylamino-s-triazine
33. 2-methylmercapto - 4-ethylamino - 6-isopropylamino-s-triazine
34. 2-methoxy-4,6-bis(ethylamino)-s-triazine
35. 2-methoxy - 4-ethylamino - 6-isopropylamino-s-triazine
36. 2-chloro-4,6-bis(isopropylamino)-s-triazine
37. Dinitro-o-sec-butylphenol and its salts
38. Pentachlorophenol and its salts
39. 2,3,6-trichlorobenzoic acid and its salts
40. 2,3,5,6-tetrachlorobenzoic acid and its salts
41. 2-methoxy - 3,5,6-trichlorobenzoic acid and its salts
42. 2-methoxy-3,6-dichlorobenzoic acid and its salts
43. 3-amino-2,5-dichlorobenzoic acid and its salts
44. 3-nitro-2,5-dichlorobenzoic acid and its salts
45. 2-methyl-3,6-dichlorobenzoic acid and its salts
46. 2,4-dichlorophenoxyacetic acid and its salts and esters
47. 2,4,5 - trichlorophenoxyacetic acid and its salts and esters
48. (2-methyl - 4-chlorophenoxy)acetic acid and its salts and esters
49. 2-(2,4,5-trichlorophenoxy)propionic acid and its salts and esters
50. 2-(2,4,5-trichlorophenoxy)ethyl - 2,2 - dichloropropionate
51. 4 - (2,4 - dichlorophenoxy)butyric acid and its salts and esters
52. 4-(2-methyl - 4-chlorophenoxy)butyric acid and its salts and esters
53. 2,3,6-trichlorobenzyloxypropanol
54. 2,6-dichlorobenzonitrile
55. Trichloroacetic acid and its salts
56. 2,2-dichloropropionic acid and its salts
57. N,N-di(n-propyl)thiolcarbamic acid, ethyl ester
58. N,N - di(n-propyl)thiolcarbamic acid, n-propyl ester
59. N-ethyl - N - (n-butyl)thiolcarbamic acid ethyl ester
60. N-ethyl-N-(n-butyl)thiolcarbamic acid, n-propyl ester
61. N-phenylcarbamic acid, isopropyl ester
62. N - (m-chlorophenyl)carbamic acid, isopropyl ester Example:
63. N-(m-chlorophenyl)carbamic acid, 4-chloro-2-butynyl ester
64. 2,3,6-trichlorophenylacetic acid and its salts
65. 2-chloro-N,N-diallylacetamide
66. Maleic hydrazide
67. Calcium propylarsonate
68. Disodium monomethylarsonate
69. Octyl-dodecylammoniummethylarsonate
70. Dimethylarsinic acid
71. Sodium arsenite
72. Lead arsenate
73. Calcium arsenate
74. Sodium tetraborate hydrated, granulated
75. Sodium metaborate
76. Sodium pentaborate
77. Polyborchlorate
78. Unrefined borate ore such as borascu
79. Ammonium thiocyanate
80. Sodium chlorate
81. Ammonium sulfamate
82. 5,6-dihydro - (4A,6A) - dipyrido - (1,2-A,2',1'-C)pyrazinium dibromide
83. 3-amino-1,2,4-triazole
84. 3,6-endoxohexahydrophthalic acid
85. Hexachloroacetone
86. Diphenylacetonitrile
87. N,N-dimethyl-α,α-diphenylacetamide
88. N,N-di-n-propyl - 2,6-dinitro - 4-trifluoromethylaniline
89. N,N-di-n-propyl-2,6-dinitro-4-methylaniline
90. O-(2,4-dichlorophenyl) - O-methyl - isopropylphosphoramidothiate
91. 2,3,5,6 - tetrachloroterephthalic acid, dimethyl ester
92. 2,4-dichloro-4'-nitrodiphenyl ether

EXAMPLE 93

| | Percent |
|---|---|
| 3-(3,4 - dichlorophenyl - 3-methoxy - 1,1-dimethylurea | 70 |
| Trimethylnonyl ether of polyethylene glycol | 4 |
| Fuller's earth | 26 |

Twenty-five pounds of this formulation is mixed with 99 gallons of water. Four pounds of triethanolamine salt of 2,4-D is added to this mixture. One hundred gallons of this spray mix is applied to a one acre area of vegetation growing along a railroad track. Excellent control of a wide variety of weeds is obtained. Ragweed, plantain, dandelion, pigweed, honeysuckle, volunteer grain, foxtail, crabgrass and bromegrass are controlled.

EXAMPLE 94

| | Percent |
|---|---|
| 3-(3,4 - dichlorophenyl) - 3-methoxy - 1,1-dimethylurea | 70 |
| Trimethylnonyl ether of polyethylene glycol | 4 |
| Fuller's earth | 26 |

This formulation is suspended in water at a concentration of 0.12 pound of active compound per gallon. 2,2-dichloropropionic acid, Na salt is added at the rate of .05 pound per gallon of water. Forty gallons of this tank mixture, containing 0.5% of trimethylnonyl ether of polyethoxyethylene is applied as a directed spray to a vigorous growth of weeds in sugar cane about 24 inches tall. Excellent control of Johnson grass seedlings, morning glory, crabgrass, barnyard grass, and foxtail is obtained. The cane shows normal growth.

The invention claimed is:

1. A composition comprising a major amount of a herbicidally acceptable diluent and a herbicidally effective amount of a compound of the formula:

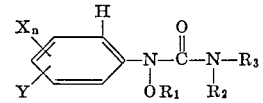

where:
X is selected from the group consisting of hydrogen, methyl, and halogen;
Y is selected from the group consisting of hydrogen, halogen, nitro, alkyl radicals of less than 5 carbon atoms, and alkoxy of less than 5 carbons;
$n$ is a positive integer less than 3;
$R_1$ is an alkyl group of less than 5 carbons;
$R_2$ is selected from the group consisting of hydrogen, alkyl of less than 5 carbons, and alkoxy of less than 5 carbons; and
$R_3$ is alkyl of less than 5 carbons with the limitation that the sum of carbon atoms in $R_2$ and $R_3$ is less than 6.

2. The method of killing weeds comprising applying to the area to be protected a herbicidally effective amount of a compound of the formula:

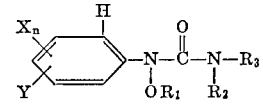

where:
X is selected from the group consisting of hydrogen, methyl and halogen;
Y is selected from the group consisting of hydrogen, halogen, nitro, alkyl of less than 5 carbons, and alkoxy of less than 5 carbons;
$n$ is a positive integer less than 3;
$R_1$ is alkyl of less than 5 carbons;
$R_2$ is selected from the group consisting of hydrogen, alkyl of less than 5 carbons and alkoxy of less than 5 carbons; and
$R_3$ is alkyl of less than 5 carbons with the limitation that the sum of carbon atoms in $R_2$ and $R_3$ is less than 6.

References Cited by the Examiner

UNITED STATES PATENTS

| 2,657,984 | 11/1953 | Braithwaite et al. | 260—553 X |
| 2,705,195 | 3/1955 | Cupery et al. | 71—2.6 |
| 2,705,727 | 4/1955 | Graham | 260—553 |
| 2,709,648 | 5/1955 | Ryker | 71—2.6 |
| 2,726,150 | 12/1955 | Wolter | 71—2.6 |
| 2,876,088 | 3/1959 | Hill et al. | 71—2.6 |
| 3,072,719 | 1/1963 | Beaver et al. | 260—553 |

OTHER REFERENCES

German printed application 1,077,477, March 10, 1960, 2 pages.

LEWIS GOTTS, *Primary Examiner.*

JULIAN S. LEVITT, *Examiner.*

J. O. THOMAS, Jr., A. J. ADAMCIK,
*Assistant Examiners.*